United States Patent [19]
Streszoff et al.

[11] Patent Number: 5,839,854
[45] Date of Patent: Nov. 24, 1998

[54] FENDER PROTECTIVE STRUCTURE FOR CURVED SURFACES

[75] Inventors: Robert Michael Streszoff, Wilmington; Philip Paul Brady, LeLand; Keith Highland, Wilmington, all of N.C.

[73] Assignee: Duramax, Inc., Middlefield, Ohio

[21] Appl. No.: 560,779

[22] Filed: Nov. 21, 1995

[51] Int. Cl.⁶ ........................................ E02B 3/26
[52] U.S. Cl. .............................. 405/215; 405/211
[58] Field of Search ............................ 405/211, 212, 405/215, 216; 114/219

[56] References Cited

U.S. PATENT DOCUMENTS

| | | | |
|---|---|---|---|
| 868,953 | 10/1907 | White | 405/216 X |
| 3,014,710 | 12/1961 | Layne | 405/215 X |
| 3,372,552 | 3/1968 | Liddell | 405/215 |
| 4,679,517 | 7/1987 | Kramer | 114/219 |
| 4,733,992 | 3/1988 | Dehlén | 405/215 |
| 4,854,258 | 8/1989 | Hausmann et al. | 117/219 |
| 4,927,007 | 5/1990 | Kramer . | |
| 4,964,760 | 10/1990 | Hartman | 114/219 X |
| 5,518,342 | 5/1996 | Wright et al. | 114/219 X |

FOREIGN PATENT DOCUMENTS 87408 4/1991 Japan ...................................... 405/215

*Primary Examiner*—Tamara L. Graysay
*Assistant Examiner*—Frederick L. Lagman
*Attorney, Agent, or Firm*—D. Peter Hochberg

[57] ABSTRACT

A fender system for protecting a high curvature surface includes a top layer of UHMWP, a middle resilient layer of elastomeric material and a base layer. The base layer and resilient layer have notches provided therein to facilitate bending the fender system in accordance with the curved surface.

8 Claims, 2 Drawing Sheets

FENDER PROTECTIVE STRUCTURE FOR CURVED SURFACES

TECHNICAL FIELD

The present invention relates to fender protective structures and more particularly to a fender protective structure for mounting on a curved surface.

BACKGROUND OF THE INVENTION

In the operation of docking a ship, because of the speed of approach, swells, currents, winds, and other factors, it is imperative to provide a protective docking system to reduce potential damage and impact to the ship being docked. One application of such an impact system applies to shipping channels where ships must navigate through narrow shipping lanes defined by wooden pilings driven into the floor of the ocean, lake or river. These wood pilings are much like telephone poles and are typically treated with creosol preservative. Ships use these pilings for containment by striking them to maintain position. Unfortunately, the life expectancy of a wood piling is not very long since the wood splinters and cracks.

Additionally, creosol is now an unacceptable preservative for immersion in water and wood is becoming harder to procure. A new piling structure is therefore highly desirable.

To this end, fender protective structures which have been utilized in the prior art for absorbing the impact of vehicles are shown in and described in commonly owned U.S. Pat. Nos. 4,679,517, 3,843,476, 3,975,491 4,596,734 and 4,923,550, all of which are issued to Kramer and hereby fully incorporated herein by reference. The fender protective structures described in these references are comprised of an outer layer of ultra high molecular weight polyethylene (UHMWP) and a resilient layer disposed immediately there beneath comprised of an elastomeric material. A base layer is typically added to the structure to make installation thereof easier.

However, the structures disclosed in the Kramer references can only be utilized on relatively flat surfaces because they are too stiff to bend onto a curved shape, such as a piling.

DISCLOSURE OF THE INVENTION

An object of the present invention is to provide a curved fender protective structure.

According to the present invention a fender protection system for protecting a curved structure from the impact of a moving object comprises a resilient layer for attachment to the structure and a plastic layer attached to said resilient layer wherein said resilient layer has a plurality of notches provided therein for relieving internal compressive forces to thereby allow the fender to conform to the shape of the current structure.

The present invention provides a fender system which can fit a wide range of small and large radius bends, such as pilings and curved railroad tresses. The present invention therefore has a wide range of applications from ship and boat docking to such things as automobile racetracks. The present invention is easy to manufacture and facilitates high energy absorption with long life expectancy.

These and other objects, features and advantages of the present invention will become more apparent in the light of the detailed descriptions of exemplary embodiments thereof, as illustrated by the drawings.

BEST MODE FOR CARRYING OUT THE INVENTION

Figure 1:
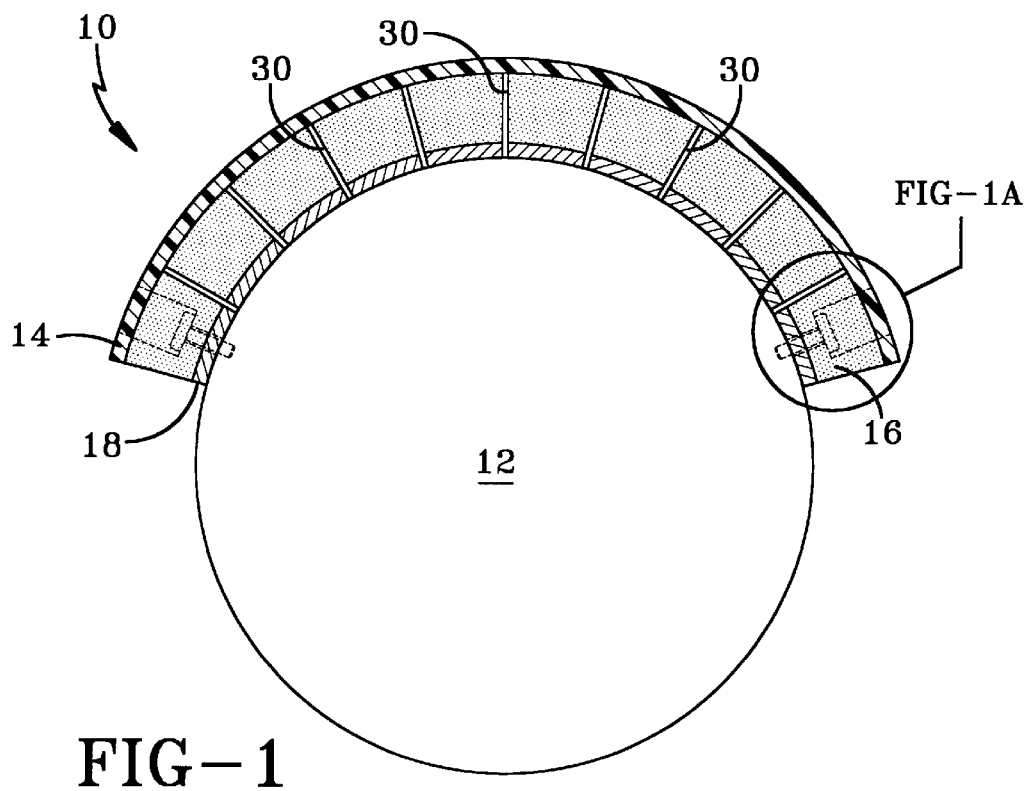
FIG. 1 is a plan view of a fender in accordance with the present invention.
Figure 1A:
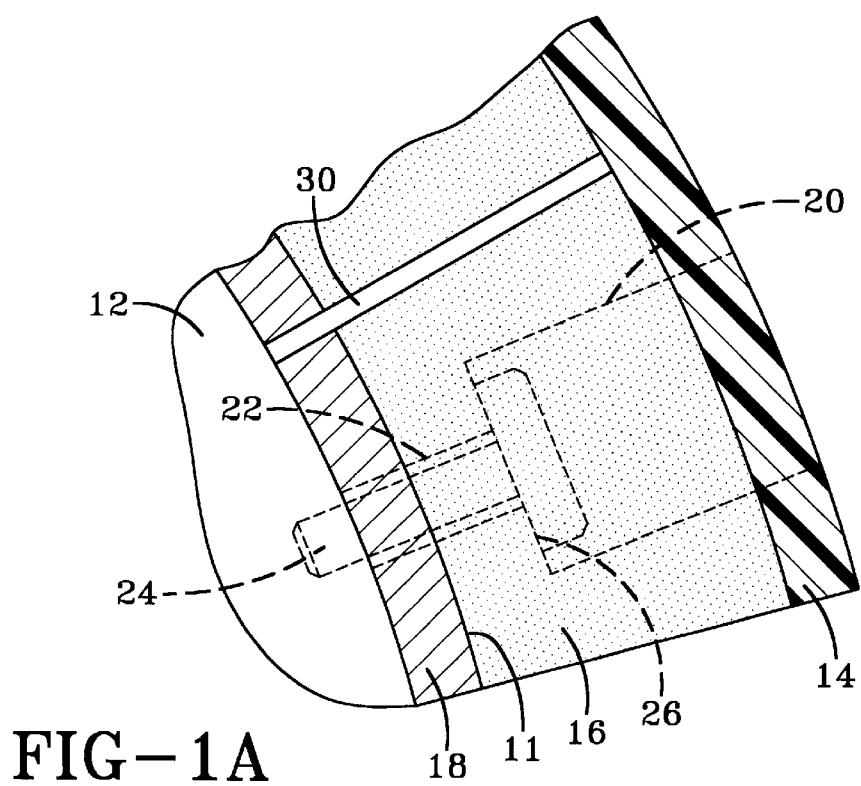
Figure 2:
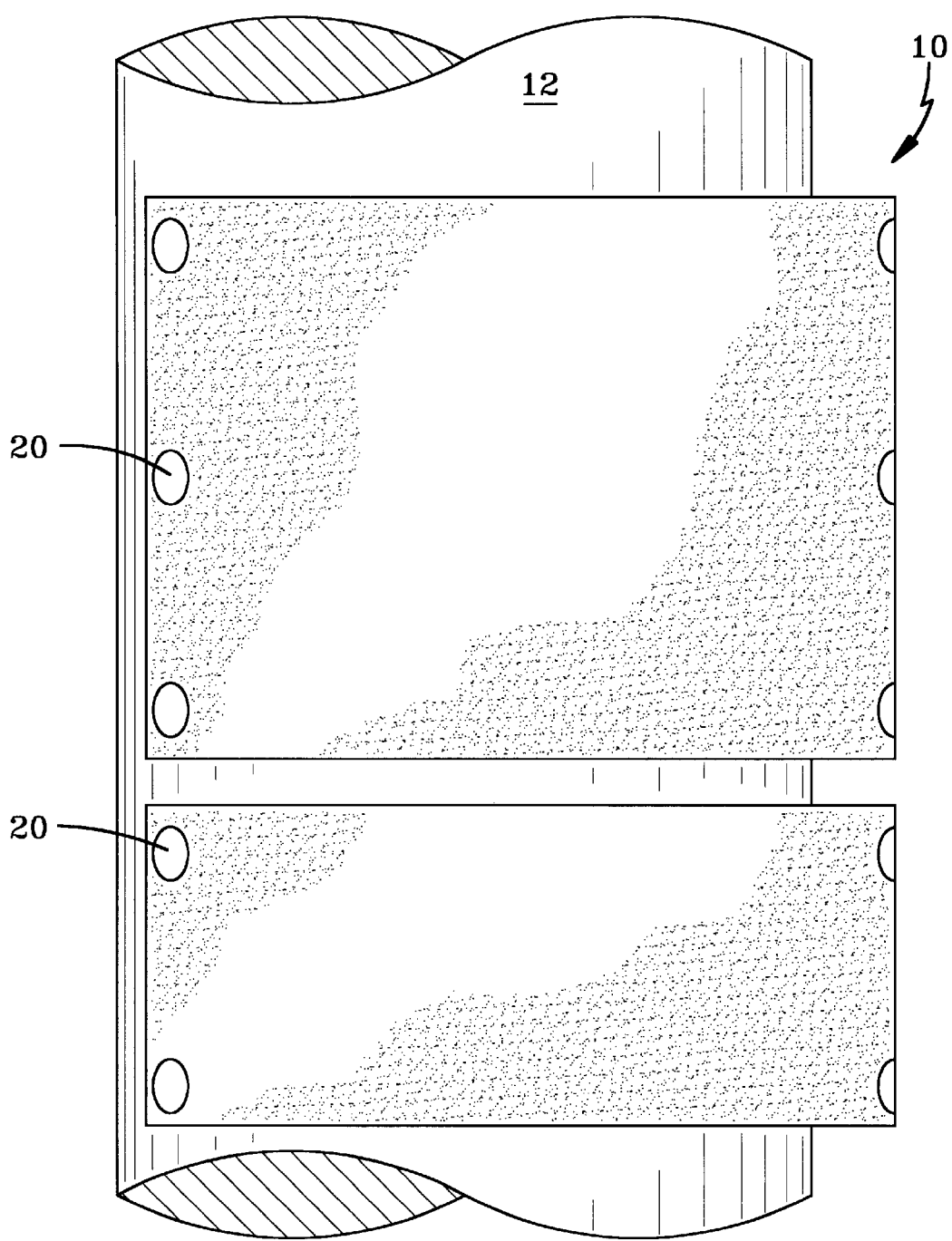
FIG. 2 is a elevational view of a fender in accordance with the present invention.

Referring now to the drawings wherein like reference numerals designate like or corresponding parts throughout the different views, there is shown in FIGS. 1 and 2 a fender 10 for attachment to a curved structure 12, such as a cylindrical piling which is driven into the ocean floor. The fender 10 includes a top layer 14, a resilient layer 16 and a bottom or base layer 18. Base layer 18 may not be necessary in certain applications. A clearance hole 20 is provided through top layer 14 and resilient layer 16. A through hole 22 is provided from resilient layer 16 through base layer 18 and provides a means for attaching the fender 10 to the curved structure 12. A bolt 24 can be inserted through clearance hole 20 and protrude into curved structure 12. The bolt would thereby be compressed on the shoulder 26 of clearance hole 20 and hold the structure in place. A plurality of such clearance holes, through holes and bolts can be provided as needed to install a large sheet of protective structure.

Alternatively, fender 10 can be bonded to the curved structure 12 utilizing an appropriate bonding agent.

A plurality of notches, or slits 30 are provided through base layer 18 and resilient layer 16. The notches may be molded or cut into the assembly. These notches, which are arranged approximately perpendicular to the plane of the panel when laid flat allow the fender to be formed around curved surfaces or corners. Normally, the internal compressive strength of the materials of resilient layer 16 and base layer 18 prevent bending of the structure. The notches 30, however, relieve these internal compressive forces, thereby allowing the fender structure 10 to be formed onto a curved structure. The notches 30 also facilitate expansion of resilient layer 16 upon impact from a moving object (not shown) to provide energy absorption characteristics. The notches therefore provide a two fold function which is to facilitate installation of the fender 10 onto a curved structure and provide energy absorption by resilient layer 16. It is to be noted that the notch configuration (length, width, depth, shape, etc.) is application dependent and may vary. For instance, the notches may not be formed completely through resilient layer 14 as shown.

In addition to the notches 30, bore holes such as those described in commonly owned U.S. Pat. No. 4,679,517 may be formed in the resilient layer to facilitate increased bulging for energy absorption purposes.

Preferred material for top layer 14 is ultra high molecular weight polyethylene (UHMWP). UHMW is understood to be a polyolefine having a high molecular weight which measured by the solution viscosity method is greater than 2.5 million. Polyolefine is understood to be a polymer or copolymer of one or more mono-olefines having no more than four carbon atoms, as well as mixtures of these polymers and/or copolymers, between themselves.

It may also be a thermoplastic-rubber polymer alloy comprised of UHMWP and a thermoset rubber compound. Such alloys are described in commonly owned U.S. Pat. No. 4,735,982, hereby fully incorporated herein by reference.

Resilient layer 16 may be any of a number of energy absorbing materials, such as elastomeric material. An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like., The preferred material for elastomeric layer 18 is EPDM rubber treated with a suitable fire retardant, such as aluminum trihydrates.

If more rigidity is required in the resilient layer 16, a plastic and rubber alloy may be utilized also. The preferred material combination of such an alloy would consist of crumb rubber obtained by grinding used automobile or truck tires together by matrix of UHMWP. Fabric and steel wire particles originally in the tires must be removed. The preferred weight is 30% UHMWP and 70% crumb rubber. The crumb rubber is preferably particles that pass through a 20 mesh screen. Because of the free flowing nature of such particles, the rubber is mixed very easily with the UHMWP powder.

Preferred material for base layer 18 is a plastic, such as UHMWP, or a metal. The base layer provides rigid integrity to the composite laminate structure to provide a resistive base of known reactive force to the resilient layer 16, so that the energy absorption rate that is controllable.

Manufacture of the fender 10 of the present invention is as follows. One surface of a base layer 18 is cleaned and prepared so that a layer of elastomer 16 may be bonded thereto. The base layer 18 is then placed in a mold with the prepared surface 11 facing outwardly of the mold. If the mold has spacers which protrude inwardly for molding notches in the resilient layer, then base layer 18 is comprised of a plurality of sections which are placed between spacers. A layer of uncured elastomer 16 is then deposited on the surface. Optionally, it may be deemed desirable to apply a film of cement between the uncured elastomer 16 and the prepared surface of the base layer 18. The surface of elastomer 16 facing away from base layer 18 is then covered with a layer of ultra-high molecular weight polyethylene powder. With the components in position, a mold cover is secured onto the mold body and sufficient pressure and heat are applied hereto to cure the elastomer 16 and melt the polyethylene powder 14. After the melted polyethylene powder has coalesced to form the polyethylene layer 14 the mold is opened, the finished wear resistant composite 10 is removed. Notches 30 are then cut into the composite if they have not already been molded into the base and resilient layers as discussed above.

Alternatively, a base layer 18 is bonded to an elastomeric layer 16 which is in turn bonded to an ultra-high molecular weight polyethylene layer 14. Notches 30 may then be cut into the composite 10.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A fender for protecting a curved structure having a generally longitudinal axis from the impact of a moving object, the fender comprising from bottom to top:
   a resilient layer for attachment to the curved structure, said resilient layer comprising a rubber polymer alloy; and
   a plastic layer attached to said resilient layer,
   wherein said resilient layer has a depth extending from the bottom of said resilient layer to said plastic layer, and a plurality of notches extending generally parallel to the longitudinal axis and substantially through the depth of said resilient layer, for relieving internal compressive forces due to bending of the fender to thereby allow said fender to conform to the shape of the curved structure and to facilitate expansion of said resilient layer upon impact from a moving object to provide energy absorption characteristics.

2. A fender according to claim 1, wherein said resilient layer is formed as a panel having a plane and said notches are provided generally perpendicular to the plane.

3. A fender according to claim 1, wherein said plastic layer is comprised of ultra high molecular weight polyethylene (UHMWP).

4. A fender according to claim 1, further comprising:
   at least one through hole through said plastic and resilient layers;
   at least one clearance hole in axial alignment with said through hole provided in said resilient layer; and,
   attachment means for inserting through said through hole and clearance hole for attaching said fender to the curved structure.

5. A fender for protecting a curved structure having a generally longitudinal axis from the impact of a moving object, the fender comprising from bottom to top:
   a base layer disposed adjacent the curved structure;
   a resilient layer attached to said base layer, said resilient layer comprising a rubber polymer alloy; and,
   a plastic layer attached to said resilient layer,
   wherein said base and resilient layers together have a depth extending from the bottom of said resilient layer to said plastic layer, and said base and resilient layers have a plurality of aligned notches extending generally parallel to the longitudinal axis and through the depth of said base layer and said resilient layer for relieving internal compressive forces due to bending of the fender to thereby allow said fender to conform to the shape of the curved structure and to facilitate expansion of said resilient layer upon impact from a moving object to provide energy absorption characteristics.

6. A fender according to claim 5, wherein said resilient layer is formed as a panel having a plane and said notches are provided generally perpendicular to the plane.

7. A fender according to claim 5, wherein said plastic layer is comprised of ultra high molecular weight polyethylene (UHMWP).

8. A fender according to claim 5, further comprising:
   at least one through hole through said plastic and resilient layers;
   at least one clearance hole in axial alignment with said through hole provided in said resilient layer; and,
   attachment means for inserting through said through hole and clearance hole for attaching said fender to the curved structure.

* * * * *